(12) United States Patent
Aydt

(10) Patent No.: US 6,364,071 B2
(45) Date of Patent: Apr. 2, 2002

(54) COMBINED DISK AND DRUM BRAKE WITH AN INTERNALLY VENTILATED BRAKE DISK

(75) Inventor: Guenter Aydt, Backnang (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/745,424

(22) Filed: Dec. 26, 2000

(30) Foreign Application Priority Data

Dec. 24, 1999 (DE) .......................................... 199 63 030

(51) Int. Cl.⁷ .............................................. F16D 63/00
(52) U.S. Cl. ................................ 188/70 R; 188/218 R; 188/218 XL; 188/264 AA
(58) Field of Search ............................ 188/71.6, 218 R, 188/218 XL, 70 R, 264 R, 264 A, 264 AA; 301/6.3

(56) References Cited

U.S. PATENT DOCUMENTS

| | | | | |
|---|---|---|---|---|
| 4,313,528 A | * | 2/1982 | Ito .......................... | 188/218 A |
| 4,596,312 A | * | 6/1986 | Kawaguchi ............... | 188/18 A |
| 5,180,037 A | | 1/1993 | Evans | |
| 5,529,149 A | * | 6/1996 | Johannesen et al. ...... | 188/70 R |

FOREIGN PATENT DOCUMENTS

| | | |
|---|---|---|
| DE | 38 24 917 | 1/1990 |
| DE | 3824917 A1 | 1/1990 |
| DE | 199 08 914 | 3/1999 |
| JP | 57-192636 | 11/1982 |
| JP | 06 249273 A | 12/1994 |
| JP | 8-296671 | 11/1996 |
| JP | 8-296672 | 11/1996 |

* cited by examiner

Primary Examiner—Christopher P. Schwartz
Assistant Examiner—Devon Kramer
(74) Attorney, Agent, or Firm—Crowell & Moring LLP

(57) ABSTRACT

An internally ventilated brake disk has two friction rings and an inside shoe brake, in the interior friction ring. A ring groove is provided which, in its base, has passage openings to air guiding ducts between the friction rings of the brake disk. The ring groove is bounded laterally by a water collecting surface and on the opposite side by a water draining surface, in which case these two surfaces are inclined with respect to an exterior groove opening such that this groove opening is narrowed. The water collecting surface is arranged in an intended manner with respect to a wall of the air guiding duct. This indentation is used for collecting splashing water and removing the splashing water by way of the air guiding duct or a space between the friction ring and the shielding metal plate to the outside.

5 Claims, 1 Drawing Sheet

COMBINED DISK AND DRUM BRAKE WITH AN INTERNALLY VENTILATED BRAKE DISK

This application claims the priority of German Patent Document 199 63 030.5, filed in Germany, Dec. 24, 1999, the disclosure of which is expressly incorporated by reference herein.

The invention relates to a combined disk and drum brake with an internally ventilated brake disk of the type referred to in German Patent Application No. 199 08 914.0.

German Patent Document DE 38 24917 A1 discloses a brake with a protruding sheet metal plate for guiding splashing water away from the brake drum.

A combined disk and drum brake with an internally ventilated brake disk is described with respect to the construction referred to above. For avoiding a penetration of water onto the contact surface of the inside shoe brake in a friction ring of the brake disk, the brake disk has a ring duct with two opposed ring grooves. An inclined water guiding metal plate of an exterior shield projects into the ring duct and, on the one hand, collects the splashing water in a water inlet position and releases the collected splashing water in a water outlet position.

It is an object of the invention to absolutely avoid, in the case of an internally ventilated brake disk with an inside shoe brake arranged in the brake drum, a penetration of splashing water onto the contact surface of the inside shoe brake and to provide a targeted water drainage by means of a ring groove which is easy to produce and which forms a surrounding duct in the brake disk.

According to the invention, this object is achieved by providing a combined disk and drum brake with an internally ventilated brake disk, having two friction rings, having a surrounding water guiding metal plate bent away from a shielding metal plate, and having an inside shoe brake arranged in a brake drum, in the interior friction ring, a ring groove being provided which, in its base, has passage openings to air guiding ducts between the friction rings, and a narrowed groove opening being provided which is situated opposite the base, which narrowed groove opening is adjoined by opposed ring surfaces within the ring groove, and the bent-away water guiding metal plate projecting into the ring groove and between the ring surfaces, and being set at an angle with respect to the ring surface such that, in an approximately vertical water entry position, the guiding plate is set at an acute angle with respect to the ring groove base and simultaneously forms a draining slope in an approximately vertical water outlet position of the guiding metal plate, wherein the ring surfaces in each case laterally bound the ring groove and form a water draining and a water collecting surface which are both arranged to be inclined with respect to the shielding metal plate at an angle ($\alpha$, $\beta$) and to be jointly narrowing the exterior ring groove opening.

Principal advantages achieved by the invention are that the ring groove in a friction ring of the brake disk with one water draining surface and one water collecting surface respectively can be produced in a simple manner. These surfaces, which bound the ring groove laterally or on the top and on the bottom, have different flat constructions and are arranged to diagonally extend toward the exterior groove opening such that a narrowed exterior groove opening is obtained.

So that the splashing water or water entering the brake disk can, without distinct ring ducts, be nevertheless collected in the lateral walls of the ring groove and be rapidly discharged to the outside, one upper lateral surface of the ring groove—viewed in the water entry position—is slightly curved and the lower opposite lateral surface is provided with an indentation with respect to the adjoining duct wall of the air guiding duct.

On the whole, the indentation in the lateral surface is situated below the level of the adjoining duct wall of the air guiding duct and is arranged to be inclined with respect to this duct wall and has a rounded end area.

Other objects, advantages and novel features of the present invention will become apparent from the following detailed description of the invention when considered in conjunction with the accompanying drawings.

DETAILED DESCRIPTION OF THE DRAWINGS

Figure 1:
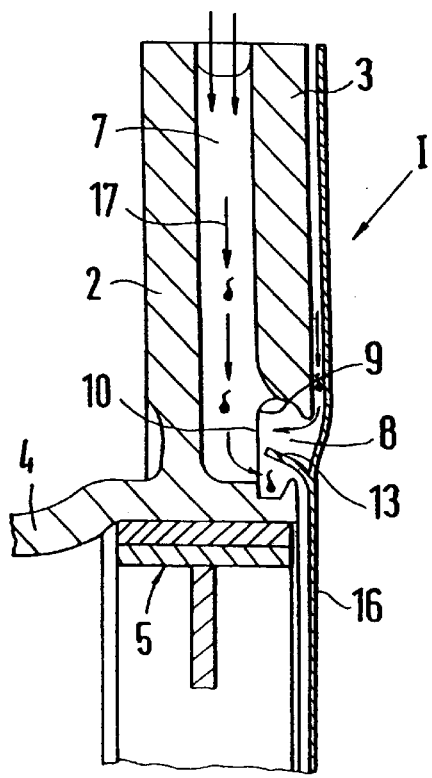
FIG. 1 is a cross-sectional view of a brake disk according to patent application 199 08 914.0 with a ring groove having two ring ducts, in a water inlet position.
Figure 2:
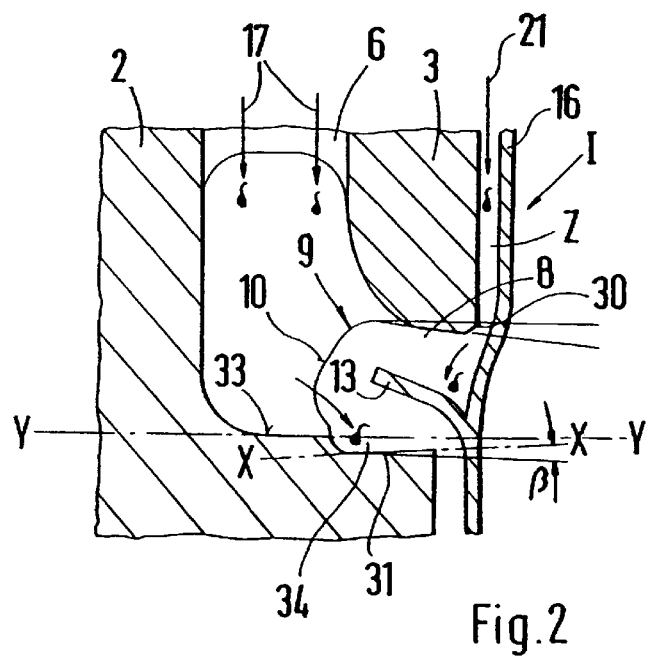
FIG. 2 is an enlarged representation of a ring groove according to the invention in a water inlet position.
Figure 3:
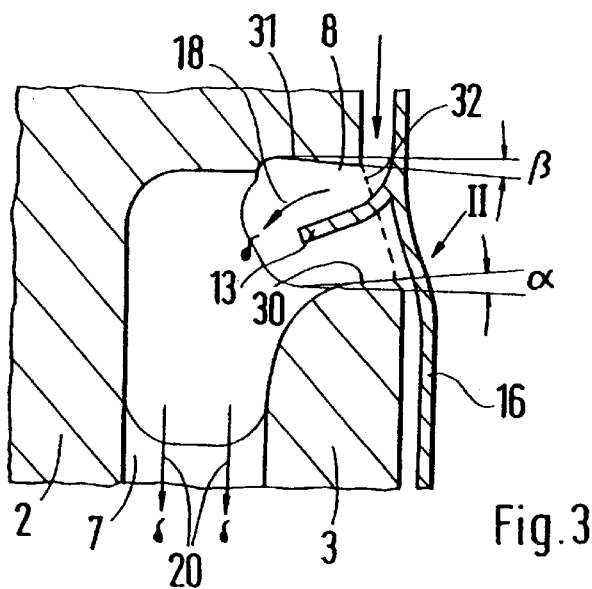
FIG. 3 is an enlarged representation of the ring groove according to the invention in a water outlet position.

An internally ventilated brake disk 1 according to FIGS. 1 to 3 comprises essentially two friction rings 2, 3 which are connected with a brake drum 4. An inside shoe brake 5 is arranged in this brake drum 4. These two friction rings 2, 3 have radial cross ribs 6 along the circumference which form air guiding ducts 7 between the friction rings 2, 3.

The one friction ring 3 of the brake disk 1, which is situated in the interior, is provided with a ring groove 8 which is arranged coaxially with respect to the brake drum. This ring groove 8 is provided at the lower end of the air guiding ducts 7 and is continuously connected with respect to these by way of openings 10 provided in the base 9.

The brake disk 1 is protected by means of a shielding metal plate 16 arranged at a distance from the interior friction ring 3. A water guiding metal plate 13, a so-called collar, which projects into the ring groove 8 is provided on this shielding metal plate 16.

Laterally, the ring groove 8 has a bounding water draining surface 30 and a so-called water collecting surface 31 on the opposite side. These two surfaces 30, 31 are situated to be inclined with respect to the exterior groove opening 32. As illustrated in greater detail in FIGS. 2 and 3, surface 30 is at an angle $\alpha$, and the other surface 31 is at an angle $\beta$.

The water draining surface 30 is slightly curved to the outside toward the groove opening 32, but may also be constructed as a plane surface.

The water collecting surface 31 is provided with an indentation 34 to the duct wall 33 of the air guiding duct 7 and is situated below the plane Y—Y of the wall 33 in a diagonal plane X—X. As a result of the inclined position at the angle $\beta$ (FIG. 2), a water discharge toward the outside in position I is prevented in water entry position I.

The water guiding metal plate 13 is inclined at an angle and extends to close to the base 9 or to the openings 10 between the cross ribs 6 of the brake disk 1. FIG. 2 illustrates a water entry position of the ring groove 8 according to the invention; that is, the water entry takes place approximately in the vertical position of the brake disk 1, in which case water or water drops can also enter into the air guiding ducts 7 in additional positions. The water flows in the direction of the arrow 17 through the openings 10 into the ring groove 8 and from there in the direction of the arrow 18 (FIG. 3)

through the opening 10 into the air guiding ducts 7 and farther into the direction of the arrow 20 to the outside.

Water and water drops entering the area Z between the shielding metal plate 16 and the interior friction ring 3 flow into the ring groove 8 in the direction of the arrow 21 and directly in the direction of the arrow 18 through the openings 10 into the air guiding ducts 7 and through the space Z to the outside.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Combined disk and drum brake with an internally ventilated brake disk, having an interior and exterior friction rings, having a surrounding water guiding metal plate bent away from a shielding metal plate, and having an inside shoe brake arranged in a brake drum, in the interior friction ring, a ring groove being provided which, in its base, has passage openings to air guiding ducts between the friction rings, and a narrowed groove opening being provided which is situated opposite the base, which narrowed groove opening is adjoined by opposed ring surfaces within the ring groove, and the bent-away water guiding metal plate projecting into the ring groove and between the ring surfaces, and being set at an angle with respect to the ring surface such that, in an approximately vertical water entry position, the guiding plate is set at an acute angle with respect to the ring groove base and simultaneously forms a draining slope in an approximately vertical water outlet position of the guiding metal plate wherein the ring surfaces in each case laterally bound the ring groove and form a water draining and a water collecting surface which are both arranged to be inclined with respect to the shielding metal plate at an angle $\alpha$, $\beta$ and to be jointly narrowing the exterior ring groove opening.

2. Combined disk and drum brake according to claim 1, wherein in the water entry position, one upper ring surface extends in an approximately curved manner to the exterior ring groove opening, the lower ring surface having a flat indentation with respect to the duct wall of the air guiding duct.

3. Combined disk and drum brake according to claim 1, wherein the flat indentation extends in a diagonal plane below a plane of the duct wall and ends in a rounding with respect to the duct wall.

4. Combined disk and drum brake according to claim 2, wherein the flat indentation extends in a diagonal plane below a plane of the duct wall and ends in a rounding with respect to the duct wall.

5. A brake assembly comprising:
   a brake disk having two spaced friction rings with air guiding ducts between the friction rings,
   a ring groove opening to radial interior ends of the air guiding ducts, and
   a shielding plate extending adjacent one of said friction rings and including a protruding section extending into the ring groove,
   wherein the ring groove is bounded by a water draining surface facing a water collecting surface, said water draining surface and water collecting surfaces being inclined such that the ring groove narrows in a direction toward the shielding plate, and
   wherein said protruding sections are disposed to guide splashing water from the space between the brake disk and the shielding plate and from the air guiding ducts.

* * * * *